United States Patent [19]

Collonia

[11] 4,278,059
[45] Jul. 14, 1981

[54] DEVICE FOR THE CONTROL OF THE TRAVELING SPEED OF A MOTOR VEHICLE

[75] Inventor: Harald Collonia, Glashütten, Fed. Rep. of Germany

[73] Assignee: VDO Adolf Schindling AG, Frankfurt am Main, Fed. Rep. of Germany

[21] Appl. No.: 71,168

[22] Filed: Aug. 30, 1979

[30] Foreign Application Priority Data

Sep. 11, 1978 [DE] Fed. Rep. of Germany ....... 2839382

[51] Int. Cl.³ .............................................. F02D 11/10
[52] U.S. Cl. .................................... 123/399; 123/319
[58] Field of Search .............. 123/102, 32 EA, 32 EJ, 123/32 EE; 180/177, 178, 179

[56] References Cited

U.S. PATENT DOCUMENTS

| | | | |
|---|---|---|---|
| 3,820,624 | 6/1974 | Sakakibara | 123/102 |
| 3,886,915 | 6/1975 | Japlin | 123/102 |
| 4,120,373 | 10/1978 | Fleischer | 123/102 |
| 4,134,373 | 1/1979 | Kibler et al. | 180/177 |
| 4,172,505 | 10/1979 | Rubus et al. | 180/178 |
| 4,188,926 | 2/1980 | Fleischer | 123/102 |

*Primary Examiner*—Charles J. Myhre
*Assistant Examiner*—R. A. Nelli
*Attorney, Agent, or Firm*—Martin A. Farber

[57] ABSTRACT

A device for the control of the traveling speed of a motor vehicle with a regulating unit which is actuatable by the vehicle driver, particularly with a gas pedal, with electrical means for the transmission of the movement of the same to an element which influences the fuel-air mixture, particularly a throttle valve, with an electrical controller, the element which influences the fuel-air mixture being in operative connection with the output of the electrical controller, and with at least one comparator, one of the inputs of the comparator being applied with a voltage which is proportional to the rotational speed of the motor and its other input being applied with an adjustable constant voltage value for the rotational speed limitation. As a controller a PI controller is connected in parallel with a P-controller of great amplification.

6 Claims, 3 Drawing Figures

DEVICE FOR THE CONTROL OF THE TRAVELING SPEED OF A MOTOR VEHICLE

The invention relates to a device for the control of the traveling speed of a motor vehicle with a regulating unit which is actuatable by the vehicle driver, particularly with a gas pedal, with electrical means for the transmission of the movement of the same to an element which influences the fuel-air mixture, particularly a throttle valve, with an electrical controller, the element which influences the fuel-air mixture being in operative connection with the output of the electrical controller, and with at least one comparator, one of the inputs of the comparator being applied with a voltage which is proportional to the rotational speed of the motor and its other input being applied with an adjustable constant voltage value for the rotational speed limitation.

In such a known device there is provided for the transmission of the signal (which signal is dependent on the position of the gas pedal) to the element which influences the fuel-air mixture, particularly an additional comparator, by which the output signal of the first-mentioned comparator, one input of which first-mentioned comparator being applied with the voltage which is proportional to the rotational speed of the motor and its other input being applied with the adjustable constant voltage for the limitation of the rotational speed, is compared with a signal corresponding to the gas pedal position. The output value of this additional comparator is then led to the setting or adjusting device via additional control amplifiers.

With this known device it is achieved that between the gas pedal and the throttle valve as the element which influences the fuel-air mixture only an electrical connection line is present, which can be wired advantageously in installation and in servicing or maintenance.

Merely one electrical position encoder is coupled with the gas pedal, which position encoder transmits an electrical signal corresponding to the position of the gas pedal, and for this purpose it can be constructed for example as a variable resistance or rheostat. This rheostat may be adjusted with the smallest or minimum displacement or control forces, so that a smooth-working or free or easy moving actuation of the gas pedal is provided for. Beyond that this actuation can be adjusted within a wide range to whatever requirements prevail. By means of the wiring of the controller with the first-mentioned comparator, whose one input is connected with a voltage which is proportional to the rotational speed of the motor and the other input of the comparator being applied with an adjustable constant voltage value for the rotational speed limitation, without essential additional expense there can be achieved a rotational speed limitation of the motor to a rotational speed which is preadjustable by means of the constant voltage value.

The rotational speed limitation of the motor vehicle should however be achieved as precisely as possible. That is to say the rotational speed should not be limited before the limit value, in order to avoid performance reductions. On the other hand the rotational speed also must not overshoot much beyond this limiting value during a transient build-up process in the control circuit or automatic control system, which otherwise, could lead to an impairment of the protective effect of the rotational speed limitation.

The present invention therefore is based on the object to further develop a device for the control of the traveling speed of a motor vehicle, particularly with means for the rotational speed limitation, such that the rotational speed limit is very exactly achieved, that yet in spite of this, no instability, particularly no overshooting occurs where the limiting value would be exceeded during a considerable period of time or by a considerable amount.

This task is aided in its solution in accordance with the invention in the manner that as controller (1) a PI controller (2, 4) is connected in parallel with a P-controller (2, 3) of great amplification.

With this solution in accordance with the invention a PI-controller is used, since this controller works exactly, without lasting or sustained control deviation. The disadvantage per se attaching to the PI-controller, that with transient build-up processes in the automatic control system a considerable overshooting occurs, is avoided by the parallel-connected P-controller with large amplification or transmission gain. This P-controller takes over from the PI-controller during the transient build-up process, whereby only a slight overshooting occurs (following curve 30 between $t_0$ and $t_1$ in FIG. 3). The disadvantage brought about by the PI-controller, that on the basis of its high amplification it can lead to monotonic unstable control, is avoided in the manner that after the build-up of oscillations, the PI-controller becomes operative and the control to the exact value takes over without control deviation and without continuous or sustained oscillations or variations (following curve 31 after $t_1$ in FIG. 3).

The alternating operativeness or activeness of the PI-controller and of the P-controller is achieved with the simplest of means, automatically in development of the invention in the manner that the outputs (25, 26) of the PI-controller and of the P-controller are led together to a common output (output terminal B) via a circuit arrangement (5 and 27, 28, respectively) which selects the largest value of the signals at the outputs (25, 26). This common output thus constitutes the output of the controller (1). By the parallel connection circuit with the largest value selection it is insured that automatically the P-controller only intervenes or acts in the automatic control system or regulating circuit as long as the transient build-up operation of the PI-controller is not yet terminated. Only subsequently does the PI-controller take over the control and thus provide for an exact control which is free of deviation.

In a particularly uncomplicated and inexpensive manner this selection of the largest value for the alternating activeness of the P-controller and of the PI-controller is realized in such a manner that a diode (27 and 28, respectively) is connected in each output line of the P-controller and the PI-controller.

The easy flow or forward conducting direction in which the diode is arranged is shown in the following description.

With the above and other objects and advantages in view, the present invention will become more clearly understood in connection with the detailed description of a preferred embodiment, when considered with the accompanying drawings, of which:

Figure 1:
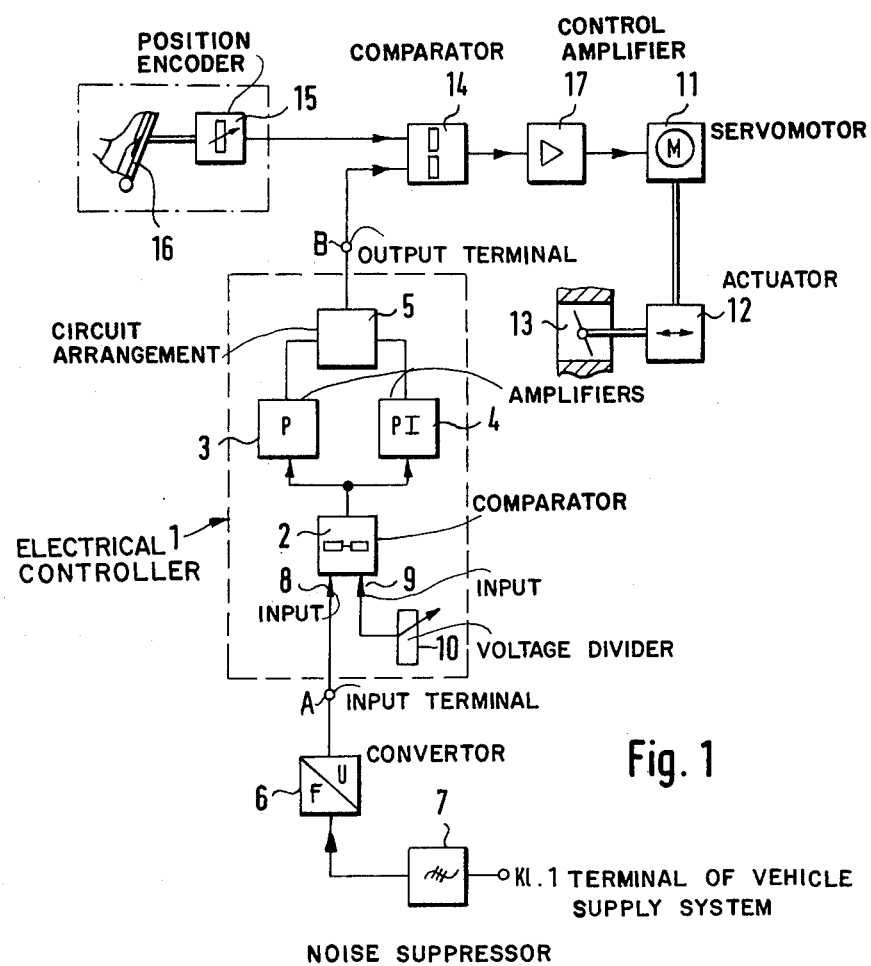
FIG. 1 is a block circuit diagram of the device of the invention with rotational speed limitation.

Referring now to the drawings, in FIG. 1 an electrical controller 1 is illustrated which comprises essentially a comparator 2 and following the comparator 2 in the signal flow direction respectively each an amplifier 3 with a proportional time response and an amplifier 4 with proportional-integral time response. Both amplifiers are connected in parallel in such a manner that they are fed from the comparator 2 with the same signal and that their outputs are uncoupled or disconnected via a circuit arrangement 5, particularly in the manner that a selection of the largest value of the signals at the outputs of the amplifers 3 and 4 results. The amplifier 3 together with the comparator 2 forms a P-controller, and the amplifier 4 together with the comparator 2 forms a PI-controller.

An input terminal A of the controller 1 is applied with a voltage which is proportional to the rotational speed of the engine, which voltage is produced from a convertor 6 from a frequency obtained from the binding post or terminal KL.1 of the motor vehicle supply system via a noise suppression or interference eliminator stage 7.

The input terminal A is connected with one input 8 of the comparator 2. A second input 9 of the comparator is applied with a preadjustable voltage signal, the preadjustable voltage signal being obtained from a voltage divider 10, the preadjustable voltage signal corresponding to a pregiven limiting value of the rotational speed.

An output terminal B of the controller is operatively connected with an electrical servomotor 11, which servomotor is connected with a setting member or positioning actuator 12 for the actuation of the throttle valve 13. An additional comparator 14 is connected between the output terminal B of the controller 1 and the electrical servomotor 11 in FIG. 1. The comparator 14 compares the output signal at the output terminal B with a signal that is transmitted from a remote position indicator or position encoder 15, the latter being coupled with the gas pedal 16, and feeds the resulting signal to the electrical servomotor 11 via an additional control amplifier 17 which is connected between the output of the comparator 14 and the servomotor 11.

The circuit arrangement illustrated in FIG. 1 operates essentially such that depending on the position of the gas pedal 16 (which position is expressed in a nominal value, and which nominal value is transmitted by the position encoder 15), the throttle valve 13 adjusts such that a certain rotational speed of the internal combustion engine is achieved. This rotational speed is maintained even with load fluctuations, since the actual value of the rotational speed goes into the automatic control system by means of the rotational speed proportional voltage at the input terminal A. Depending upon the adjustment of the voltage divider 10 however a predetermined maximum value for the rotational speed is not exceeded.

Figure 2:
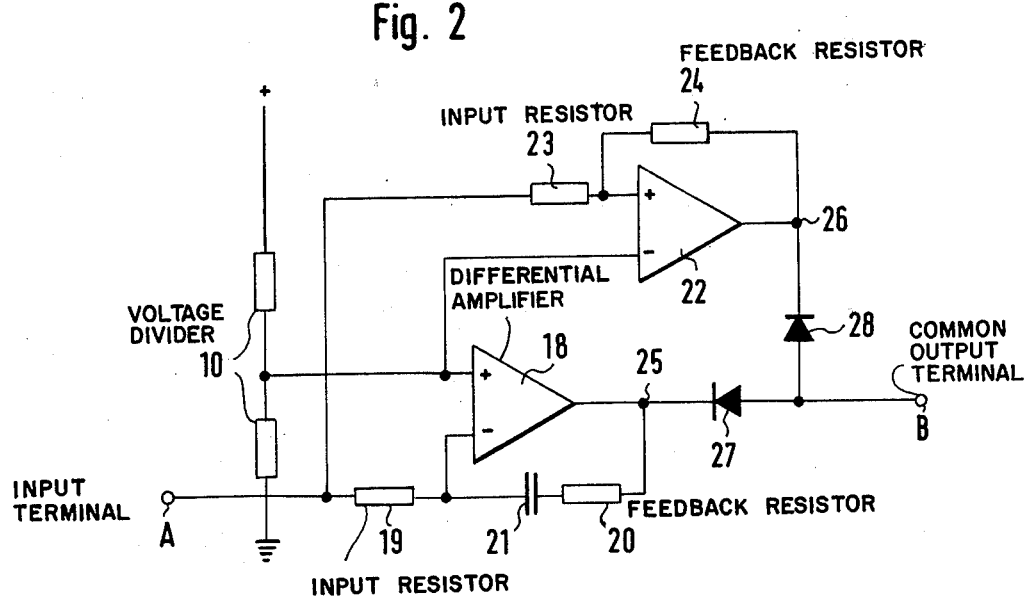
FIG. 2 is a circuit diagram of the PI-controller and P-controller connected in parallel in accordance with the invention.

The function of the P-controller and of the parallel connected PI-controller is explained according to the following description according to FIG. 2. In FIG. 2 a differential amplifier 18 of the PI-controller is illustrated. This amplifier is in connection with the input terminal A via an input resistor 19. A feedback resistor 20 and a capacitor 21 are arranged in the feedback branch or path of the differential amplifier 18.

An input resistor 23 and a feedback resistor 24 are associated with a differential amplifier 22 of the P-controller. Whereas respectively one input of the differential amplifiers 18 and 22 each is coupled with the input terminal A, respectively, one second input of these differential amplifiers is in connection with the voltage divider 10, by which voltage divider 10 a voltage signal can be set, which voltage signal is determinative of the limiting value of the rotational speed.

The output 25 of the PI-controller and the output 26 of the P-controller are connected with the common output terminal B of the controller 1 via a diode 27 and 28, respectively. The diodes uncouple, separate or isolate the outputs of the P-controller and of the PI-controller and cause respectively in each instance under the circumstances the largest signal of the outputs of these two controllers to appear at the output terminal B.

Figure 3:
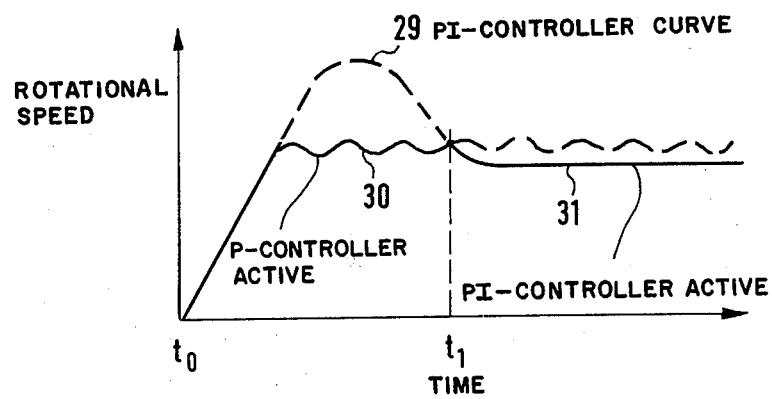
FIG. 3 is a graph illustrating the time relationship of the rotational speed according to a jump or discontinuity of the nominal value in the device according to FIG. 1.

If in the control circuit according to FIG. 1 a nominal value jump or discontinuity occurs, the rotational speed runs timewise corresponding to the illustration in FIG. 3. From the time $t_0$ to $t_1$, during which time the PI-controller would yield a comparatively large overshooting of the rotational speed corresponding to the curve path 29, the P-controller is operative with comparatively large or strong amplification or gain and causes an attainment of the new rotational speed that is almost free of overshooting, corresponding to the curve path 30. This curve path however could cause small oscillations continuing beyond the time $t_1$ of the rotational speed as a consequence of the strong amplification of the P-controller, moreover, particularly when larger oscillations or variations are to be avoided, and a notable control deviation should be taken into account or should be considered. Because of this, after the moment $t_1$ the PI-controller takes over the control corresponding to the curve path 31, whereby the new rotational speed is exactly achieved without continuing or lasting deviation and monotonic oscillation or variation.

While there has been disclosed one embodiment of the invention it is to be understood that this embodiment is given by example only and not in a limiting sense.

I claim:

1. In a device for the control of the traveling speed of a motor vehicle with a regulating unit which is actuatable by the vehicle driver, particularly with a gas pedal, with electrical means for the transmission of the movement of the regulating unit to an element which influences the fuel-air mixture, particularly a throttle valve, with an electrical controller, the element which influences the fuel-air mixture being in operative connection with the output of the electrical controller, and including at least one comparator, one of the inputs of the comparator being applied with a voltage which is proportional to the rotational speed of the motor and its other input being applied with an adjustable constant voltage value for the rotational speed limitation, the improvement wherein the electrical controller includes, a PI-controller having a proportional-integral time response, and a P-controller, having a proportional time response, of large amplification connected in parallel with said PI-controller, whereby said electrical controller is active during every change in the rotational speed to achieve a new rotational speed substantially without overshooting and oscillations.

2. The device as set forth in claim 1, wherein said PI-controller and said P-controller each have an output with a signal thereat, circuit arrangement means for selection of the largest value of the signals at said outputs of said PI-controller and of said P-controller, said outputs of said PI-controller and of said P-controller are led together via said circuit arrangement means to a common output receiving said largest value of the signals, said common output being the output of the electrical controller.

3. The device as set forth in claim 2, wherein
said circuit arrangement means constitutes diodes, one of said diodes respectively is connected to each of said outputs of the P-controller and of the PI-controller.

4. The device as set forth in claim 1, wherein
said electrical controller includes means for causing the P-controller to be active to control the output of the electrical controller during every change of rotational speed and after a certain moment then to cause the P-controller to be inactive to control the output of the electrical controller and the PI-controller to be active to control the output of the electrical controller.

5. The device as set forth in claim 1, wherein
said electrical controller includes means for making said P-controller active to control the output of the electrical controller and said PI-controller inactive to control the output of the electrical controller as long as a transient build-up of said PI-controller occurs.

6. The device as set forth in claim 2 or 3, wherein
said PI-controller together with said comparator comprises a first differential amplifier having two inputs and one output, a first feedback resistor and a capacitor connected in series between said output of said differential amplifier and one of said inputs of said differential amplifier, a first input resistor connected to said one input of said differential amplifier, the other input of said differential amplifier being applied with the adjustable constant voltage of the rotational speed limitation, said first input resistor being applied with the voltage which is proportional to the rotational speed of the motor, said P-controller together with said comparator comprises a second differential amplifier having two inputs and one output, a second feedback resistor connected between the output of said second differential amplifier and one of the inputs of said second differential amplifier, a second input resistor connected to said one input of said said second differential amplifier, the other input of said second differential amplifier being applied with the adjustable constant voltage of the rotational speed limitation, said second input resistor being applied with the voltage which is proportional to the rotational speed of the motor, said outputs of said first and second differential amplifiers constitute said outputs of said PI-controller and said P-controller, respectively.

* * * * *